(12) United States Patent
Ott et al.

(10) Patent No.: US 11,150,413 B2
(45) Date of Patent: *Oct. 19, 2021

(54) MOLDED FERRULES FOR OPTICAL FIBERS

(71) Applicant: CommScope Technologies LLC, Hickory, NC (US)

(72) Inventors: Michael James Ott, Hudson, WI (US); Paul Suek, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 746 days.

This patent is subject to a terminal disclaimer.

(21) Appl. No.: 15/898,804

(22) Filed: Feb. 19, 2018

(65) Prior Publication Data

US 2018/0172919 A1  Jun. 21, 2018

Related U.S. Application Data

(63) Continuation of application No. 14/036,602, filed on Sep. 25, 2013, now Pat. No. 9,897,764.

(Continued)

(51) Int. Cl.
*G02B 6/38* (2006.01)
*B29L 11/00* (2006.01)
*B29D 11/00* (2006.01)

(52) U.S. Cl.
CPC ............ *G02B 6/3826* (2013.01); *B29D 11/00* (2013.01); *G02B 6/3865* (2013.01); *B29L 2011/0075* (2013.01)

(58) Field of Classification Search
CPC ........ B29C 2045/0006; B29C 45/2628; B29C 45/36; B29C 45/14549; B29C 45/2606; B29C 45/261; B29C 2035/0827; B29C 35/0888; B29C 45/0025; B29C 45/0046; B29C 45/14426; B29C 45/14467; B29C 45/14639; B29C 45/40; B29C 2033/0005;

(Continued)

(56) References Cited

U.S. PATENT DOCUMENTS 4,932,989 A  6/1990 Presby
4,984,865 A  1/1991 Lee et al.

(Continued)

FOREIGN PATENT DOCUMENTS

EP  1 223 445 A1  7/2002
JP  3471460  9/2003
JP  2004-117616  4/2004

OTHER PUBLICATIONS

Comet™ System Description Laser-Based Fiber Optic Connector Cleaver, 5 pages (Date printed Jul. 20, 2009).

(Continued)

*Primary Examiner* — Jeffrey M Wollschlager
*Assistant Examiner* — Armand Melendez
(74) *Attorney, Agent, or Firm* — Merchant & Gould P.C.

(57) ABSTRACT

A method of manufacturing fiber optic connectors includes precision molding optical ferrule assemblies around optical fibers for use in the connectors. The optical ferrule assemblies are over-molded in two-parts: a ferrule and a hub. The ferrule is molded around a coated section of fiber and a fiber tip is formed (e.g., using a laser) at a stripped section of the optical fiber at a location axially spaced from the ferrule. The fiber is pulled into the ferrule to align the tip and the hub is formed to complete the ferrule assembly.

10 Claims, 15 Drawing Sheets

Related U.S. Application Data

(60) Provisional application No. 61/707,389, filed on Sep. 28, 2012.

(58) Field of Classification Search
CPC .... B29C 2043/5808; B29C 2045/0036; B29C 2045/0043; B29C 2045/0049; B29L 2011/0075; B29L 2011/0016; B29L 2011/00; B29L 2031/36
See application file for complete search history.

(56) References Cited

U.S. PATENT DOCUMENTS

| | | | |
|---|---|---|---|
| 5,214,730 A | 5/1993 | Nagasawa et al. |
| 5,251,279 A | 10/1993 | Shibata et al. |
| 5,276,752 A | 1/1994 | Gugelmeyer |
| 5,371,816 A | 12/1994 | Pan |
| 5,375,183 A | 12/1994 | Edwards et al. |
| 5,377,286 A | 12/1994 | Iida et al. |
| 5,519,799 A | 5/1996 | Murakami et al. |
| 5,548,675 A | 8/1996 | Shigematsu et al. |
| 5,712,939 A | 1/1998 | Shahid |
| 5,737,463 A | 4/1998 | Weiss et al. |
| 5,743,785 A | 4/1998 | Lundberg et al. |
| 5,786,002 A | 7/1998 | Dean et al. |
| 5,845,028 A | 12/1998 | Smith et al. |
| 5,855,503 A | 1/1999 | Csipkes et al. |
| 5,867,620 A | 2/1999 | Bunin et al. |
| 6,007,257 A | 12/1999 | Ogawa et al. |
| 6,106,368 A | 8/2000 | Childers et al. |
| 6,220,764 B1 | 4/2001 | Kato et al. |
| 6,246,026 B1 | 6/2001 | Vergeest |
| 6,282,349 B1 | 8/2001 | Griffin |
| 6,328,479 B1 | 12/2001 | Schofield et al. |
| 6,331,081 B1 | 12/2001 | Ohtsuka et al. |
| 6,340,247 B1 | 1/2002 | Sakurai et al. |
| 6,347,890 B2 | 2/2002 | Ueno et al. |
| 6,352,372 B1 | 3/2002 | Shahid |
| 6,357,928 B1 | 3/2002 | Haley et al. |
| 6,416,236 B1 | 7/2002 | Childers et al. |
| 6,579,014 B2 | 6/2003 | Melton et al. |
| 6,628,886 B2 | 9/2003 | Sommer et al. |
| 6,648,520 B2 | 11/2003 | McDonald et al. |
| 6,769,811 B2 | 8/2004 | Hall et al. |
| 6,773,166 B2 | 8/2004 | Trezza et al. |
| 6,817,778 B2 | 11/2004 | Kang et al. |
| 6,825,440 B2 | 11/2004 | Ohta et al. |
| 6,848,870 B2 | 2/2005 | Grabbe et al. |
| 6,854,898 B2 | 2/2005 | Natori et al. |
| 6,899,465 B2 | 5/2005 | Trezza et al. |
| 6,899,467 B2 | 5/2005 | McDonald et al. |
| 6,913,397 B2 | 7/2005 | Kang et al. |
| 6,945,706 B2 | 9/2005 | Gimbel et al. |
| 6,957,920 B2 | 10/2005 | Luther et al. |
| 6,963,687 B2 | 11/2005 | Vergeest et al. |
| 7,004,639 B2 | 2/2006 | Norland |
| 7,082,250 B2 | 7/2006 | Jones et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,197,224 B2 | 3/2007 | Rolston et al. |
| 7,216,512 B2 | 5/2007 | Danley et al. |
| 7,377,700 B2 | 5/2008 | Manning et al. |
| 7,393,142 B2 | 7/2008 | Dean, Jr. et al. |
| 7,527,435 B2 | 5/2009 | Dean, Jr. et al. |
| 8,580,162 B2 | 11/2013 | Ott et al. |
| 2003/0005942 A1 | 1/2003 | Johnson, III et al. |
| 2003/0026550 A1 | 2/2003 | Demangone |
| 2003/0063868 A1 | 4/2003 | Fentress |
| 2005/0180695 A1 | 8/2005 | Bronstein et al. |
| 2005/0180702 A1 | 8/2005 | Kevern et al. |
| 2005/0249465 A1 | 11/2005 | Kevern et al. |
| 2006/0137403 A1 | 6/2006 | Barr et al. |
| 2008/0067158 A1 | 3/2008 | Levesque |
| 2008/0210362 A1 | 9/2008 | Douglass et al. |
| 2008/0232744 A1 | 9/2008 | Dean et al. |
| 2009/0098401 A1 | 4/2009 | Yamaki et al. |
| 2010/0301502 A1 | 12/2010 | Ott et al. |
| 2011/0081115 A1 | 4/2011 | Seng |
| 2014/0064665 A1 | 3/2014 | Ott et al. |

OTHER PUBLICATIONS

Comet™ World's First Commercially Available Non-Contact Laser-Based Fiber Optic Connector Cleaver, 2 pages (Date printed Jul. 20, 2009).

U.S. Appl. No. 14/463,158, filed Aug. 19, 2014 entitled "Fiber Optic Connector, Fiber Optic Connector and Cable Assembly, and Methods for Manufacturing".

MOLDED FERRULES FOR OPTICAL FIBERS

CROSS REFERENCE TO RELATED APPLICATIONS

This application is a continuation of application Ser. No. 14/036,602, filed Sep. 25, 2013, now U.S. Pat. No. 9,897,764, which application claims the benefit of U.S. Provisional Application No. 61/707,389, filed Sep. 28, 2012, and titled "Molded Ferrules for Optical Fibers," which applications are incorporated herein by reference in their entirety.

BACKGROUND

Conventional optical connectors include ferrules that hold one or more optical fibers. The ferrules are machined from ceramic or other such materials, which can be relatively expensive. The fibers are threaded through passages defined through the ferrules and secured to the ferrules using epoxy. To accommodate tolerance in the optical fiber diameter, the ferrules are formed with ample space along the passages to receive fibers of varying diameters. Accordingly, tuning (e.g., clocking) optical fibers within the ferrules takes time and resources. Tips of the fibers are cleaned and polished after securing the fibers to the ferrules. If a fiber tip is damaged during polishing, the ceramic ferrule and fiber are discarded and the process is restarted, requiring additional time and resources.

SUMMARY

Accordingly to some aspects of the disclosure, a method of manufacturing a fiber optic connector includes (a) preparing an optical fiber by stripping part of a coating from a core and cladding of the optical fiber resulting in a coated section and a bare section of the optical fiber; (b) injection molding a coating grip around the coated section of the optical fiber; (c) inserting the bare section of the optical fiber into a mold; (d) tensioning the optical fiber within the mold; (e) molding a ferrule and a partial hub around the bare section of the optical fiber by injecting molding material into the mold; (f) forming a fiber tip at a location spaced from the ferrule; (g) scoring part of the coated section at an end of the partial hub; (h) pulling the fiber until the fiber tip is positioned at a desired location relative to the ferrule; (i) molding a ferrule hub over the coating grip and the partial hub to form a completed ferrule assembly; and (j) assembling a remainder of the fiber optic connector using the completed ferrule assembly.

A molded ferrule apparatus for an optical fiber including a ferrule molded around a coated section of an optical fiber, a partial hub molded around the coated section of the optical fiber, a grip arrangement molded around the coated section of the optical fiber, and a hub molded over the partial hub and grip arrangement to be integral with the ferrule. The ferrule defines an inner passage through which the fiber extends. The inner passage is defined by an inner circumference that engages an exterior circumference of the optical fiber. The partial hub is integral to the ferrule. The grip arrangement is axially offset from the partial hub.

An injection molding apparatus includes a main conduit; branch conduits coupled to the main conduit to form a continuous passageway therewith; injector tips that extend from the branch conduits, and ferrule molds that are configured to couple to free ends of the injector tips to receive molding material supplied from the continuous passageway. The injector tips have hollow interiors that communicate with the continuous passageway. Each of the ferrule molds is shaped and sized to form an optical ferrule around an optical fiber received through the ferrule mold.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, optical ferrules can be over-molded to optical fibers to form precision optical ferrules. Ferrules hubs also can be over-molded to the fibers. Such over-molded ferrules and hubs would facilitate the manufacture of fiber optic connectors. The optical fibers would no longer need to be threaded through passages in the ferrules. Accordingly, the passages would not need an interior cross-dimension that is wider than an exterior cross-dimension of the optical fibers. Tightening the dimensions of the passages may increase the performance of the fibers and/or may enable the fibers to be more precisely "clocked" within the ferrules.

Figure 1:
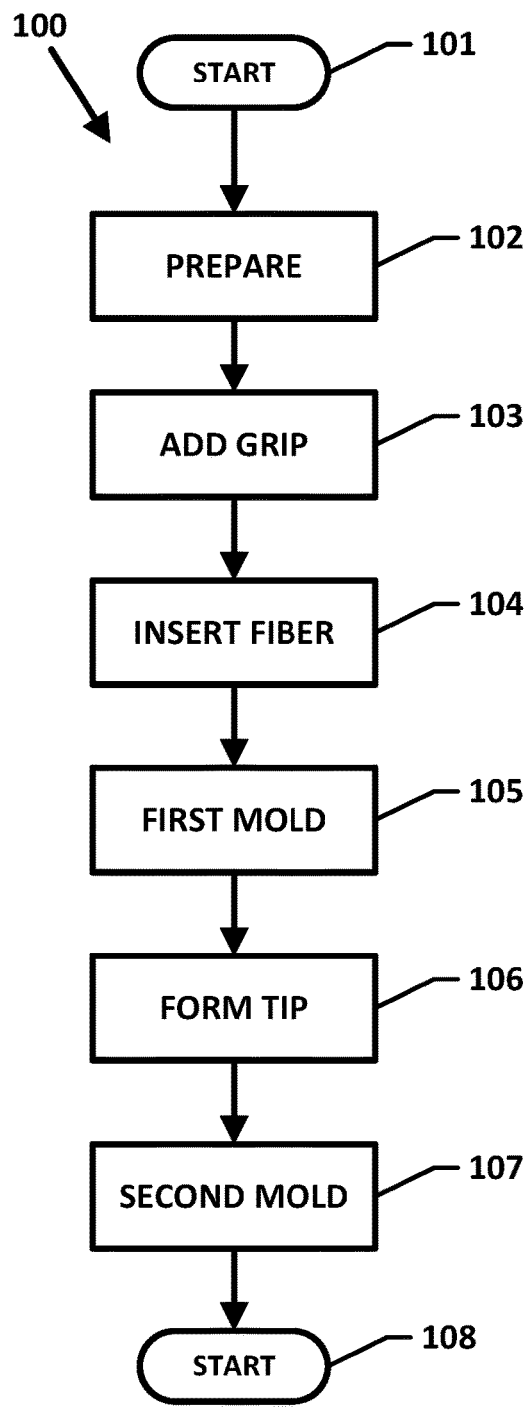
FIG. 1 is a flowchart illustrating an example flow for an over-molding process by which a ferrule assembly can be formed on an optical fiber.

FIG. 1 is a flowchart illustrating an example flow for an over-molding process 100 by which a ferrule assembly can be formed on an optical fiber 130. The optical fiber 130 includes a core surrounded by a cladding, which is surrounded by a coating. For example, a ferrule assembly can be precision molded to the optical fiber. FIGS. 3-9 illustrate the results of the steps of the over-molding process 100. FIGS. 10-15 illustrate two example types of over-molding machines with which the over-molding process 100 can be implemented.

The over-molding process 100 begins at a start module 101, performs any appropriate initialization procedures, and proceeds to a prepare operation 102. In general, the prepare operation 102 prepares a section 135 of an optical fiber 130 (FIG. 3) to be retained by a ferrule arrangement 170 (e.g., see FIG. 5). For example, the prepared section 135 may be located at a terminated end of the optical fiber 130. The prepare operation 102 includes stripping a coating 134 (FIG. 3) from a core and cladding component 132 of the optical fiber 130 to form the prepared section 135. One example preparation process 120 with which the prepare operation can be implemented will be disclosed herein with reference to FIG. 2.

Figure 3:
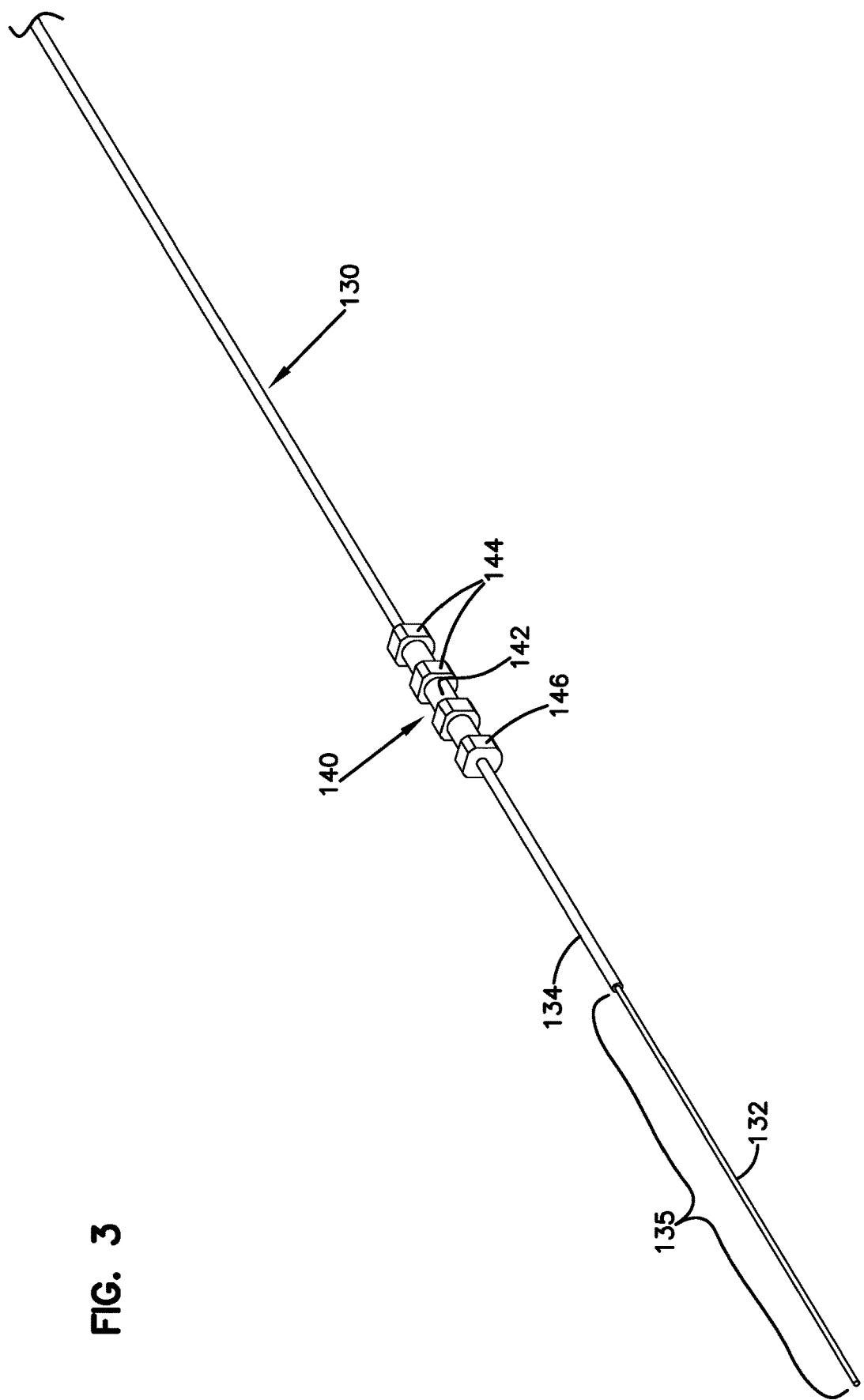
FIG. 3 is a perspective view of part of an optical fiber having a grip arrangement formed at an axially spaced location from a prepared section.

Continuing with the over-molding process 100, an add operation 103 forms a grip arrangement 140 over another portion of the optical fiber 130 (e.g., see FIG. 3). In some implementations, the grip arrangement 140 is formed over a coated portion of the optical fiber 130. In certain implementations, the grip arrangement 140 is formed at a location that is axially spaced from the prepared section 135. In some implementations, the grip arrangement 140 includes one or more axially spaced grip members 144. In certain implementations, connectors 142 extend between the grip members 144. In the example shown, the connectors 142 are tube shaped and integral with the grip members 144.

In some implementations, the grip arrangement 140 includes one or more orientation indicators 146 (e.g., see FIG. 3) that indicate in which direction the optical fiber 130 is to be clocked relative to a ferrule 150 of the ferrule arrangement 170. In certain implementations, each orientation indicator 146 is disposed on one of the grip members 144. In the example shown, each grip member 144 includes three flat sides and one round indicator side 146. The round side 146 faces the opposite direction in which the fiber 130 is to be clocked. In other implementations, the orientation indicators 144 may define other shapes or include other visual aids to indicate orientation.

Figure 11:
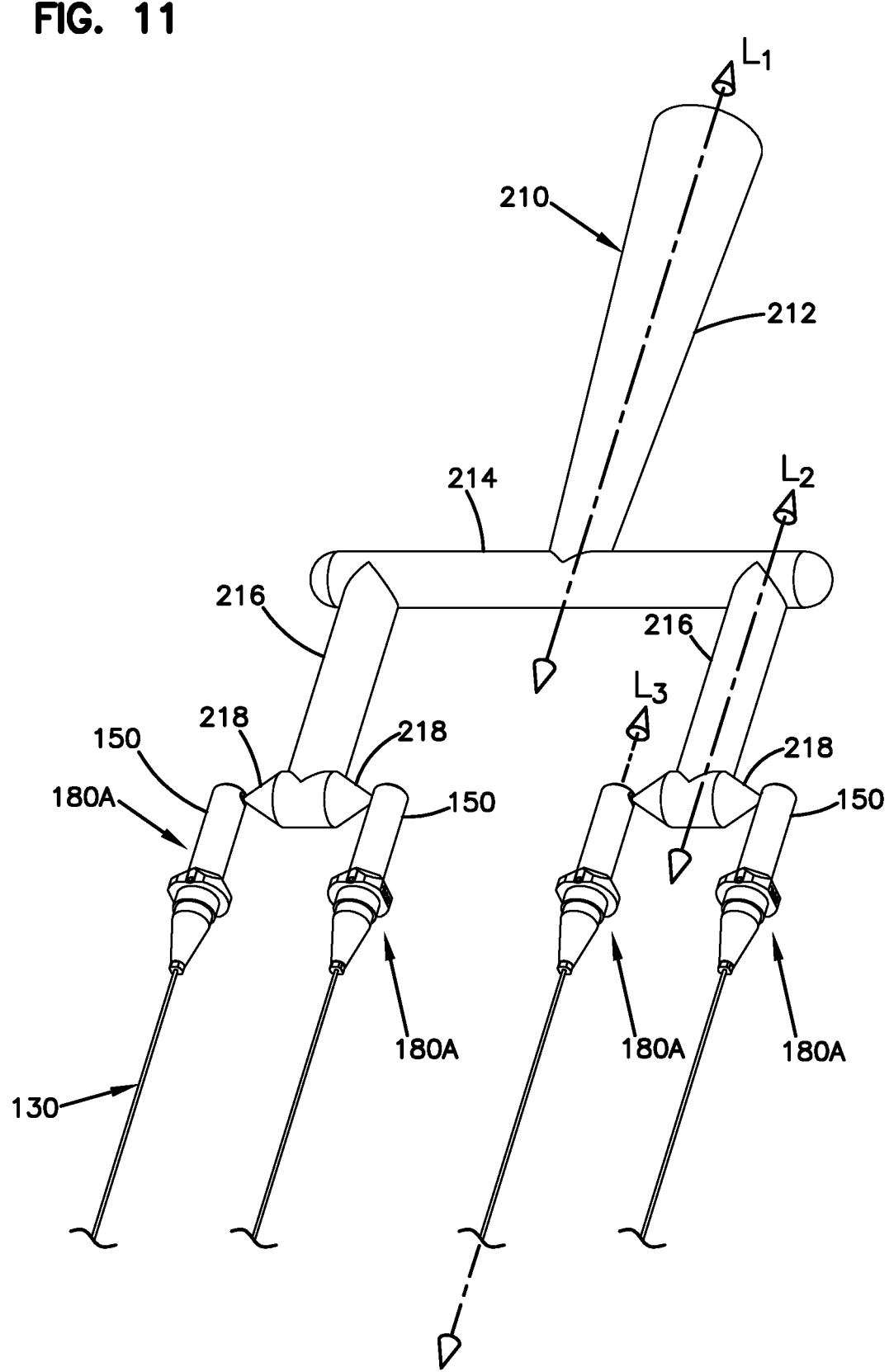
FIGS. 11-13 show an example material injector coupled to over-molded ferrule assemblies formed using the first type of ferrule mold.
Figure 12:
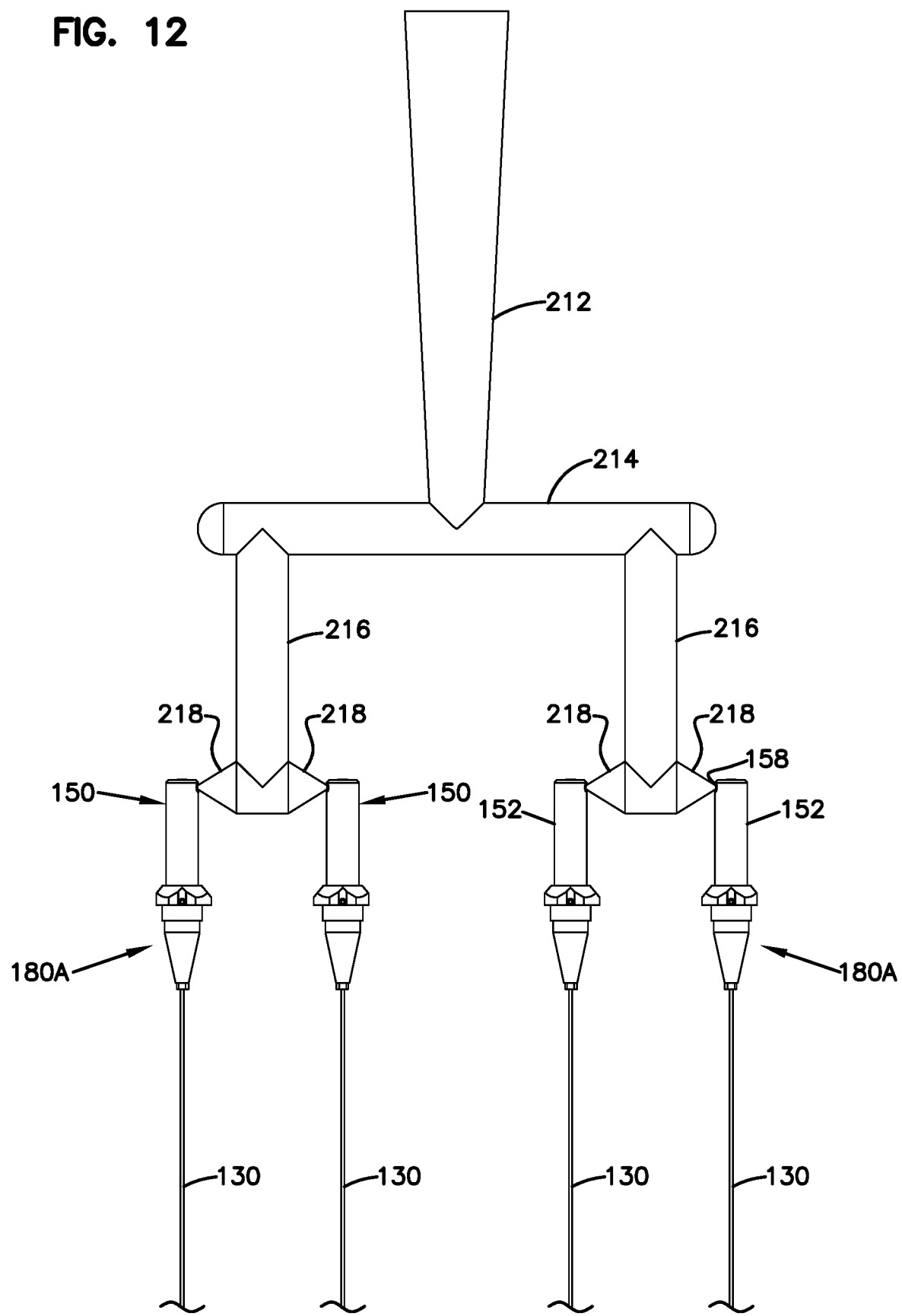
Figure 13:
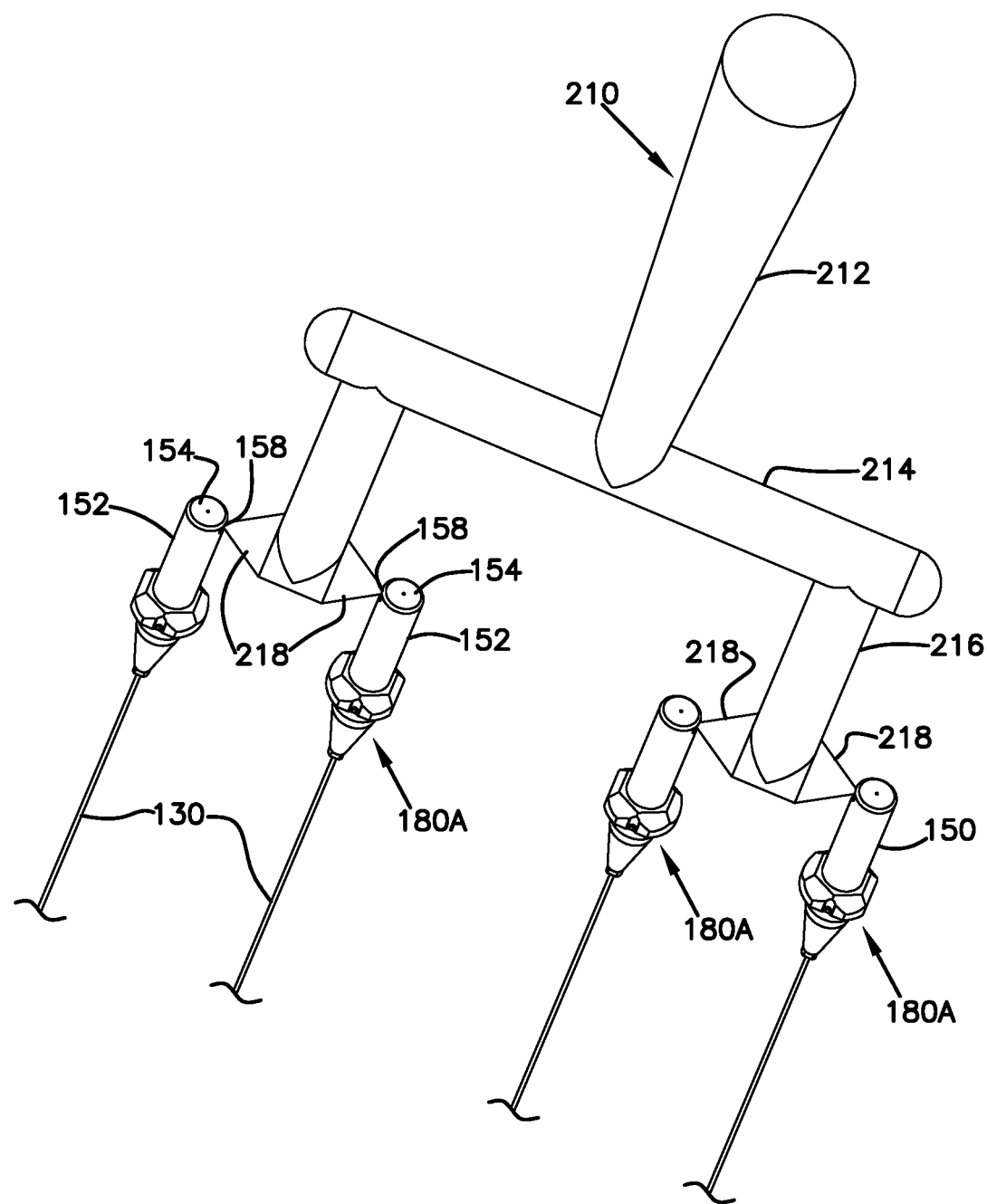
Figure 14:
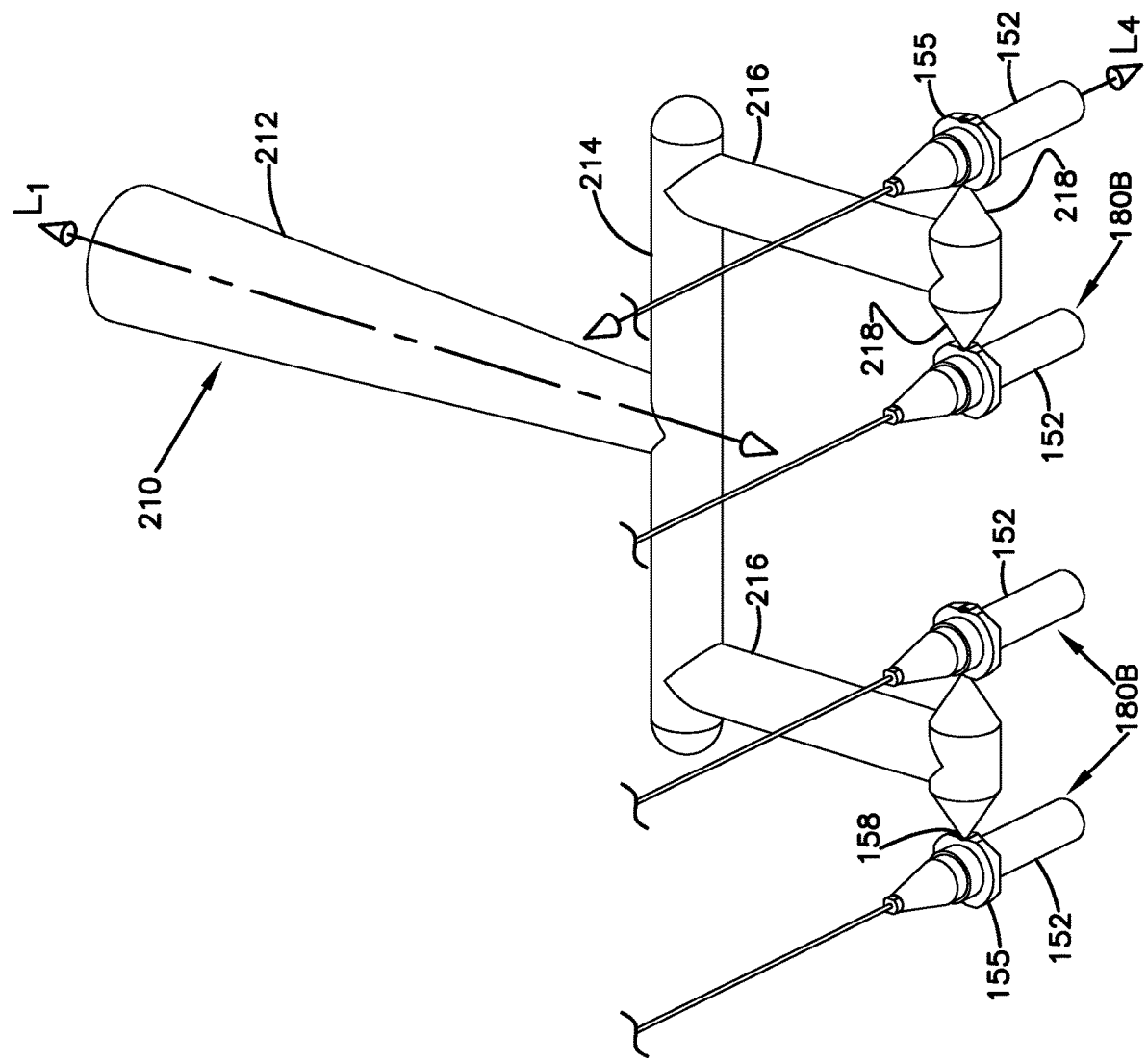
FIGS. 14-16 show an example material injector coupled to over-molded ferrule assemblies formed using the second type of ferrule mold.
Figure 15:
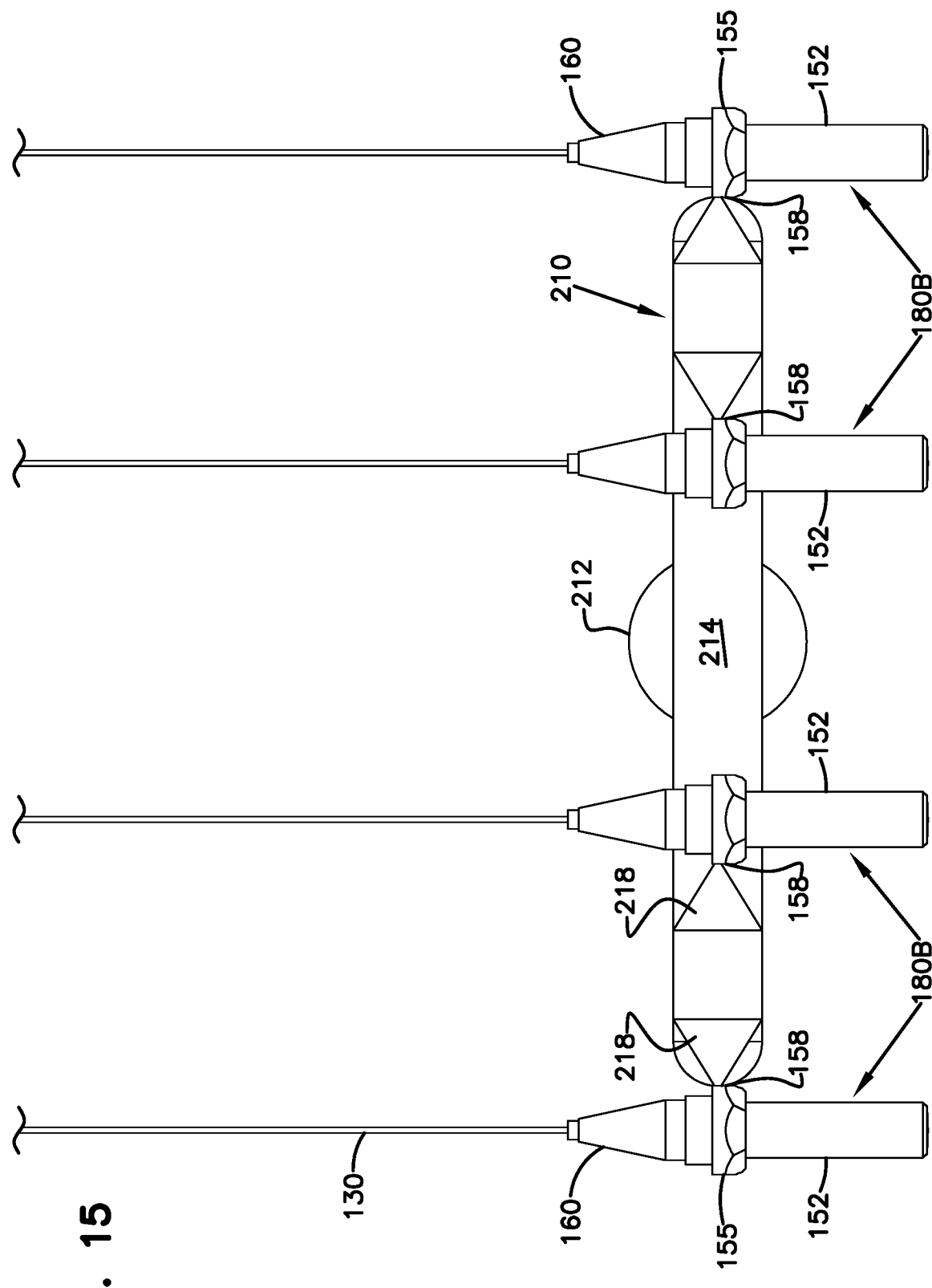
Figure 16:
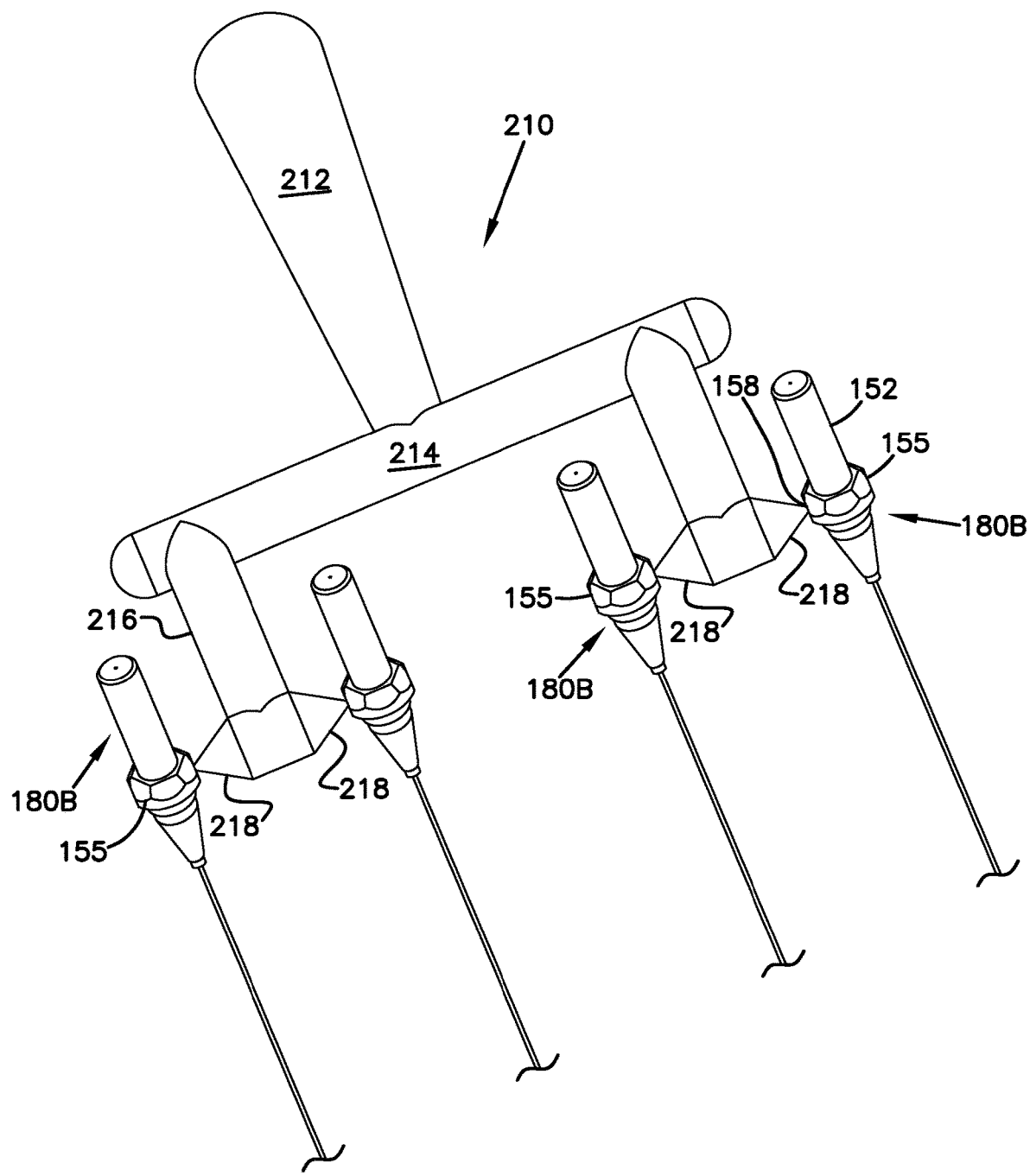

An insert operation 104 positions the optical fiber 130 within an over-molding system (e.g., ferrule mold 220 of FIGS. 11-13 or system 230 of FIGS. 14-16). The over-molding system includes at least a ferrule mold. In some implementations, the insert operation 104 threads the optical fiber 130 through a vertically extending passage defined in a first type of ferrule mold. In such implementations, a terminated end of the prepared section 135 is fed into and through the vertical passage of the first ferrule mold until at least a portion of the prepared section 135 extends from an opposite end of the first ferrule mold. In certain implementations, the terminated end is processed (e.g., by a laser) to form a pointed tip to facilitate insertion into the vertical passage. In other implementations, the insert operation 104 lays the optical fiber 130 along a horizontally extending passage defined in a second type of ferrule mold. In such implementations, the optical fiber 130 is laid so that at least a portion of the prepared section 135 protrudes from the second ferrule mold.

In certain implementations, the ferrule mold surrounds the prepared section 135 of the optical fiber 130. In other implementations, the ferrule mold surrounds a portion of the prepared section 135 of the optical fiber 130. For example, in certain implementations, a majority of the fiber 130 extending through the ferrule mold is coated and a portion of the prepared section 135 extends out of the ferrule mold. In certain implementations, the coating of the fiber 130 terminates adjacent a front end of the ferrule mold. In other implementations, the ferrule mold surrounds only the coated section of the optical fiber 130 adjacent the prepared section 135. In certain implementations, the optical fiber 130 is tensioned within the ferrule mold. For example, a user may grip the optical fiber 130 at the coated section with one hand and at the prepared section 135 with the other hand and pull in opposite directions.

A first mold operation 105 injects a molding material into the ferrule mold. The ferrules and hubs can be over-molded using injection molding systems. In some example molding systems, the ferrule molds (e.g., ferrule mold 220 of FIG. 10A) are oriented so that the fibers extend vertically through the molds (see FIGS. 11-13). In other example molding systems, the ferrule molds (e.g., ferrule mold 230 of FIG. 10B) are oriented so that the fibers extend horizontally through the molds (see FIGS. 14-16).

Figure 4:
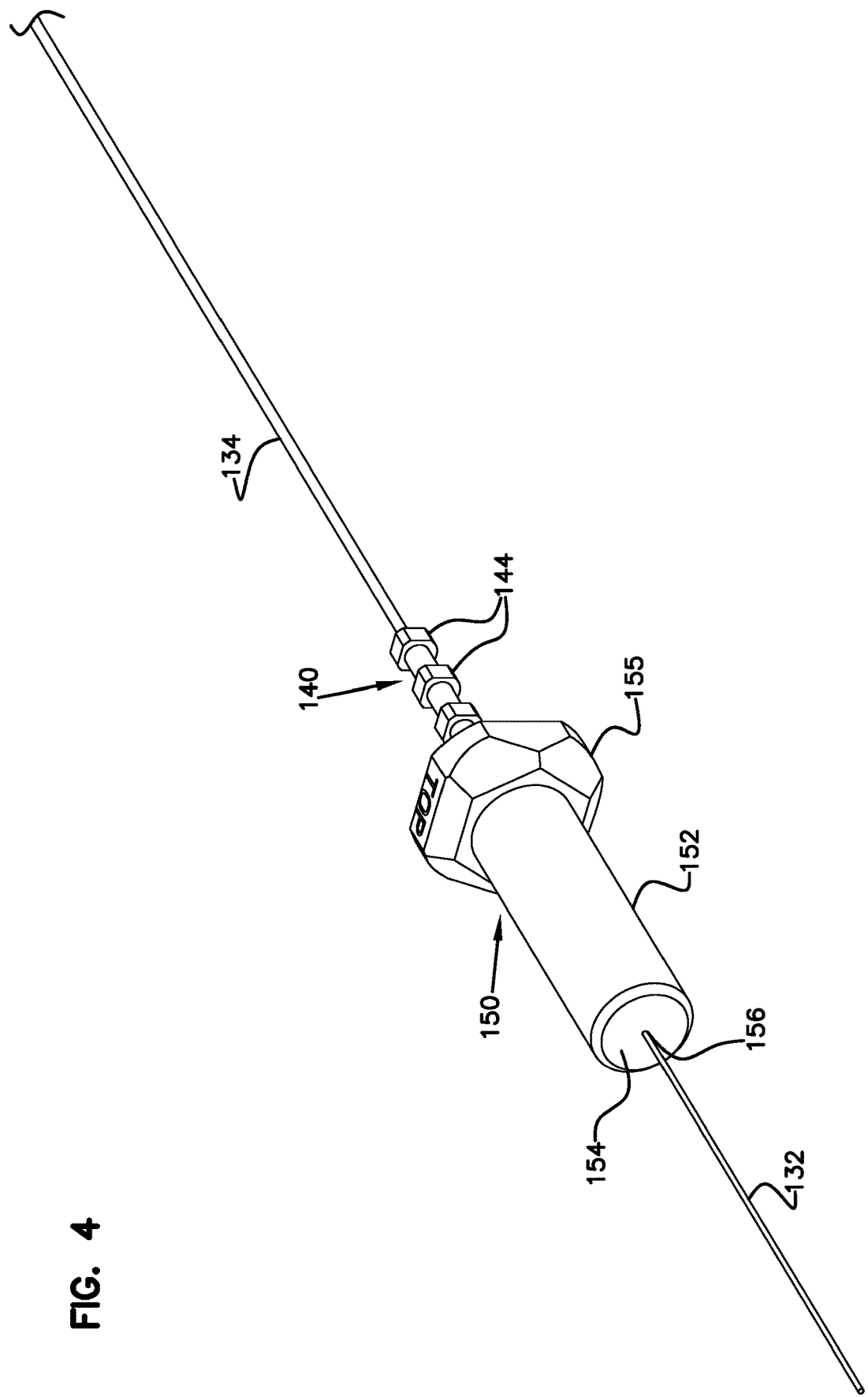
FIG. 4 is a perspective view of the optical fiber having a ferrule arrangement and partial hub formed around the optical fiber of FIG. 3.
Figure 5:
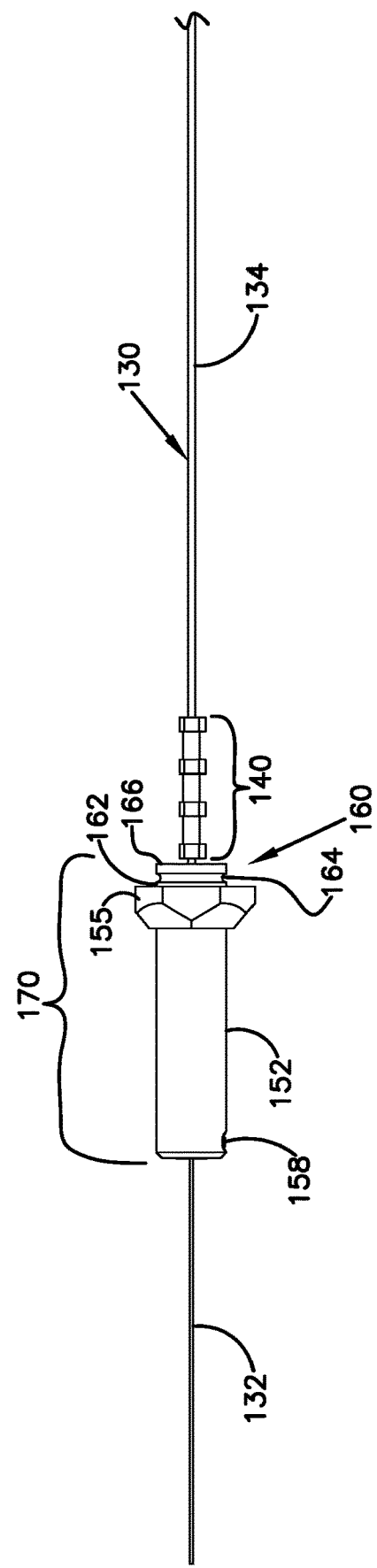
FIG. 5 is a side elevational view of the fiber of FIG. 4.

The first mold operation 105 produces an over-molded ferrule 150 and partial hub 160 as shown in FIGS. 4 and 5. The over-molded ferrule 150 includes an annular body 152 that surrounds the optical fiber 130. The annular body 152 defines a ferrule tip 154 at an opposite end of the body 152 from the partial hub 160. In some implementations, the ferrule tip 154 defines a flat surface. In certain implementations, the ferrule tip 154 includes a tapered ring that extends from a flat surface to the circumference of the annular body 152.

The annular body 152 also includes a skirt 155 that extends radially outwardly from the annular body 152 of the ferrule 150 at an opposite end from the ferrule tip 154 (see FIG. 4). The skirt 155 defines a tapered surface that faces towards the ferrule tip 154. In certain implementations, the skirt 155 is knurled or otherwise textured to facilitate gripping the skirt 155. In some implementations, the ferrule body 152 defines a flash 158 at the parting line of the molded ferrule body 152. The flash is formed wherein the molding material is injected into the first ferrule mold. In other implementations, the annular body 152 does not define a flash 158. For example, certain types of molding systems inject the molding material into the ferrule mold at a location spaced from the annular body 152.

The annular body 152 defines a through-passage 156 through which the optical fiber 130 extends. In some implementations, an inner diameter of the through-passage 156 is substantially the same as the outer diameter of the coating 134 of the optical fiber 130. In certain implementations, the difference in diameter between the through-passage 156 and the coating 134 is no more than 1.5 µm. In certain implementations, the difference in diameter between the through-passage 156 and the coating 134 is no more than 1 µm. In certain implementations, the difference in diameter between the through-passage 156 and the coating 134 is no more than 0.5 µm. In certain implementations, a portion of the inner diameter of the through-passage 156 is exactly the same as the outer diameter of the coating 134 of the optical fiber 130.

In certain implementations, an inner diameter of the through-passage 156 is substantially the same as the outer diameter of the core and cladding component 132 of the fiber 130. In certain implementations, the treatment applied to the core and cladding component 132 and/or the coating 134 of the fiber 130 provide sufficiently low friction with the annular body 152 that the fiber 130 can be moved (e.g., slid) along the through-passage a distance of about five millimeters. In other implementations, the inner diameter of the through-passage 156 is sufficiently larger than the outer diameter of the coating 134 to enable the fiber 130 to be threaded along the through-passage 156 a distance of about five millimeters.

The partial hub 160 extends axially outwardly from the ferrule skirt 155 away from the ferrule tip 154. The partial hub 160 includes a first section 162, a second section 164, and a third section 166. The first section 162 is located adjacent the ferrule skirt 155. The second section 164 extends between the first and third sections 162, 166. The second section 164 has a reduced cross-dimension (e.g., diameter) compared to the first and third sections 162, 166. The partial hub 160 is axially spaced from the grip arrangement 140. Accordingly, a short portion 138 of the optical fiber 130 is visible between the partial hub 160 and the grip arrangement 140. The short portion 138 includes the coating 134.

Continuing with the over-molding process 100, a form operation 106 processes the prepared section 135 of the optical fiber 130 to produce a suitable tip 136 at the terminated end of the optical fiber 130. In some implementations, the form operation 106 includes removing a portion of the prepared section 135 to form the tip 136 an axial distance from the ferrule tip 154 (see FIG. 6). In some implementations, the fiber tip 136 is prepared using a laser. For example, in certain implementations, the fiber tip 136 is prepared using a $CO_2$ laser.

In some implementations, the form operation 112 forms an angled surface at the fiber tip 136. In other implementations, the form operation 112 forms a domes surface at the fiber tip 136. In still other implementations, the form operation 112 forms a flat surface transverse to the longitudinal axis of the optical fiber 130 at the fiber tip 136. In certain implementations, the fiber tip 136 is polished during the form operation 106. In certain implementations, the laser-formed fiber tip 136 does not need to be polished.

In some implementations, the fiber tip 136 may be formed between 0.5 mm and 20 mm away from the ferrule tip 154. In certain implementations, the fiber tip 136 may be formed between 1 mm and 15 mm away from the ferrule tip 154. In certain implementations, the fiber tip 136 may be formed between 2 mm and 10 mm away from the ferrule tip 154. In one implementation, the fiber tip 136 is formed about 5 mm away from the ferrule tip 154. In other implementations, the fiber tip 136 may be formed no more than 8 mm away from the ferrule tip 154. In certain implementations, the fiber tip 136 may be formed no more than 5 mm away from the ferrule tip 154.

The form operation 106 also aligns the fiber tip 136 with the ferrule tip 154. For example, in some implementations, the optical fiber 130 is pulled axially through the over-molded ferrule 150 and partial hub 160 so that the fiber tip 136 approaches the ferrule tip 154. In some implementations, the fiber tip 136 is aligned to be flush with the ferrule tip 154. In other implementations, the fiber tip 136 is recessed within the ferrule tip 154. In still other implementations, the fiber tip 136 protrudes from the ferrule tip 154.

Figure 6:
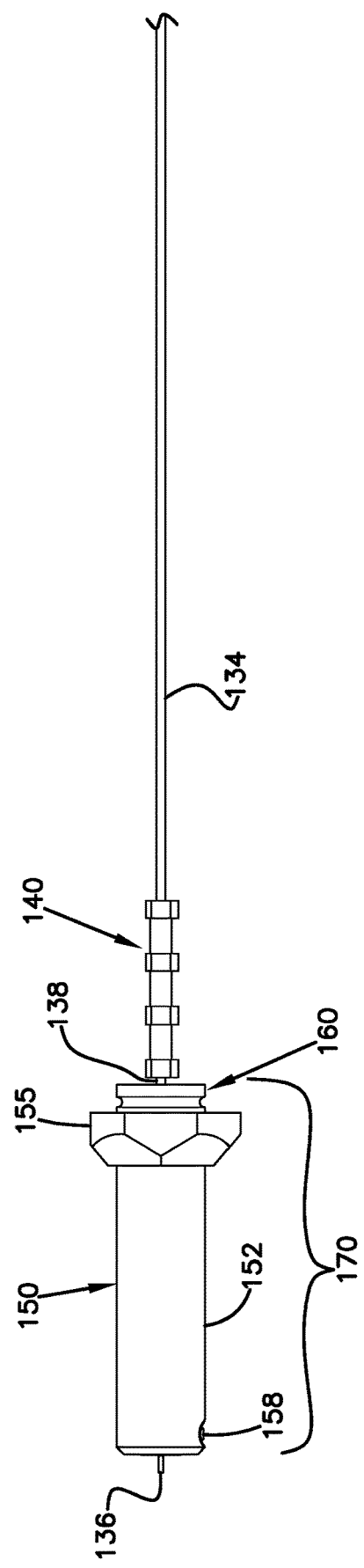
FIG. 6 is a side elevational view of the fiber of FIG. 5 after a fiber tip has been formed at the prepared section.
Figure 7:
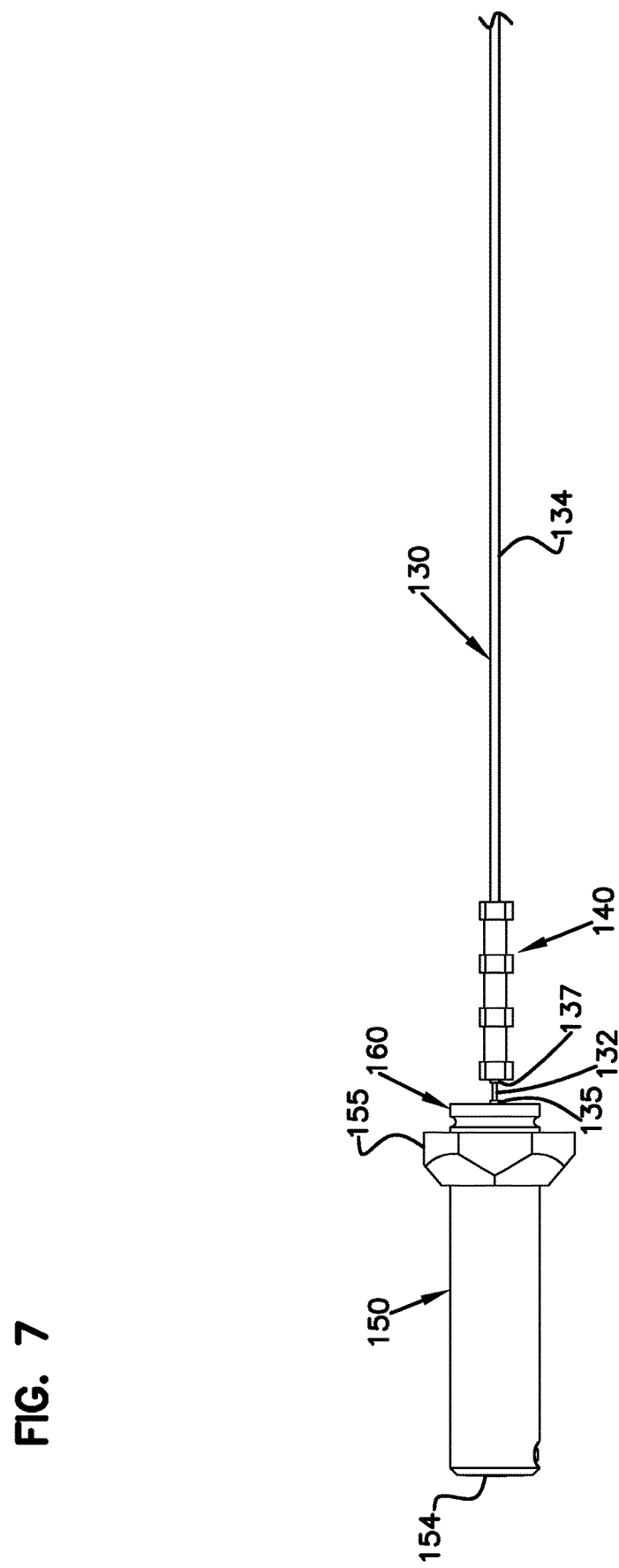
FIG. 7 is a side elevational view of the fiber of FIG. 6 after the fiber tip has been aligned with a ferrule tip of the ferrule arrangement.

In some implementations, a user scores the coating 134 at the short portion 138 of the optical fiber 130 that is visible between the partial hub 160 and the grip arrangement 140 (see FIG. 6). The user then pulls on the optical fiber 130 (e.g., via the grip arrangement 140) to break the coating 134 at the score line. In FIG. 7, the fiber core and cladding component 132 is visible between a terminated end 135 of the coating 134 that extends through the over-molded ferrule 150 and a terminated end 137 of the coating 134 that extends through the grip arrangement 140.

Continuing to pull on the optical fiber 130 (e.g., via the grip arrangement 140) causes the optical fiber 130 to move relative to the over-molded ferrule 150. In some implementations, the core and cladding of the fiber move relative to the coating 134 contained within the over-molded ferrule 150 (see FIG. 7). For example, in some implementations, the over-molded ferrule 150 may be bonded to the coating 134 to inhibit relative movement therebetween. In other implementations, the over-molded ferrule 150 may be friction-fit to the coating 134 to inhibit relative movement therebetween. In some implementations, the prepared section 135 of the optical fiber 130 moves relative to the over-molded ferrule 150 partially due to the treatment applied to the prepared section 135 that will be described herein. Accordingly, the prepared section 135 of the optical fiber 130 is pulled into the through-passage 156 of the over-molded ferrule 150.

In some implementations, the optical fiber 130 is moved using a precision pulling machine (e.g., mechanical pulling machine). In certain implementations, the optical fiber 130 is pulled at a substantially continuous speed at least until the fiber tip 136 approaches the ferrule tip 154. In some implementations, the movement of the optical fiber 130 can be tracked using a high resolution camera and/or and an interferometer. In certain implementations, the camera and/or interferometer control the movement of the pulling machine. In other implementations, a user independently controls the movement of the pulling machine based on information obtained by the user from the camera and/or interferometer.

Figure 8:
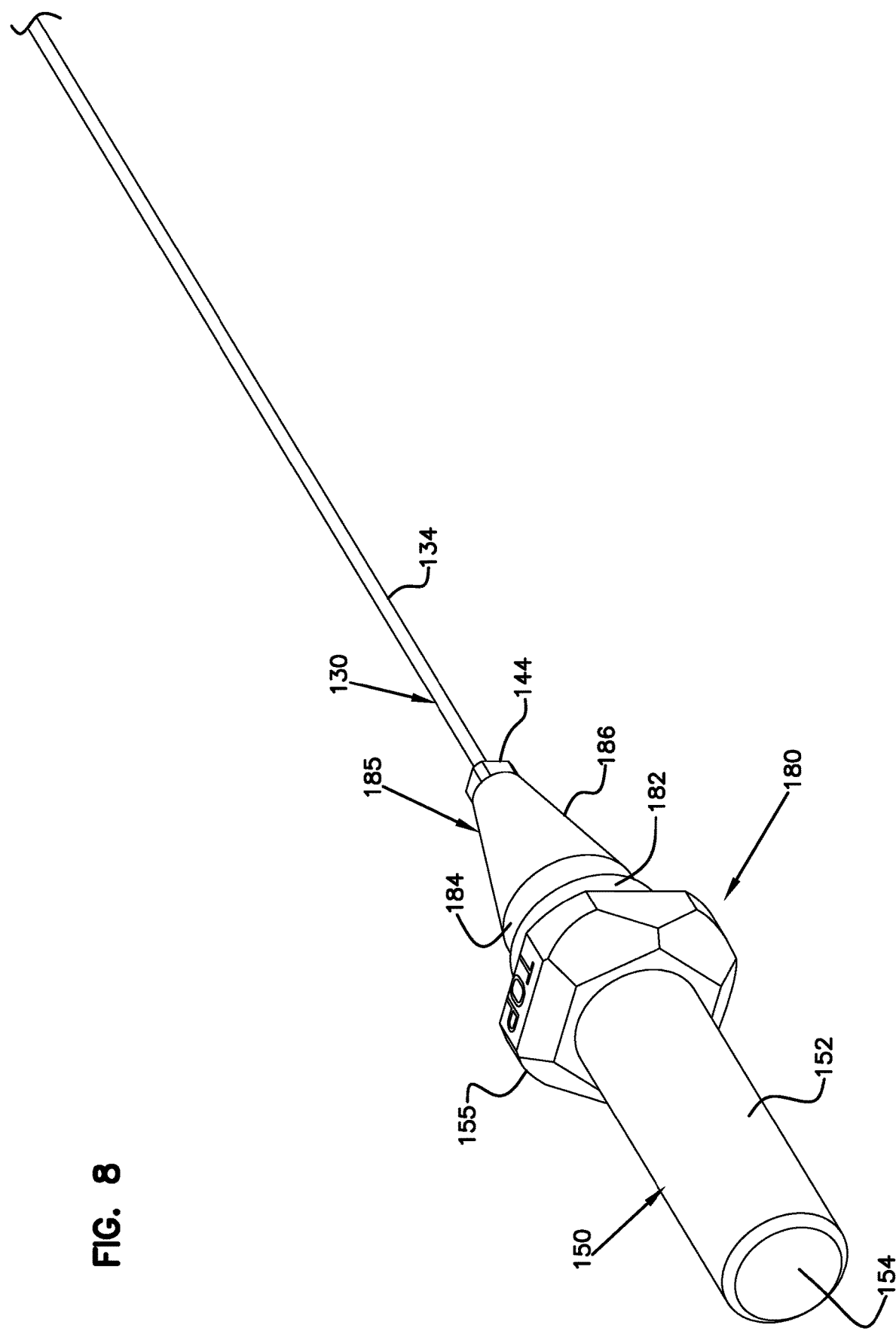
FIG. 8 is a perspective view of a ferrule assembly including the ferrule arrangement of FIG. 7 with a hub formed around the partial hub and at least part of the grip arrangement.
Figure 9:
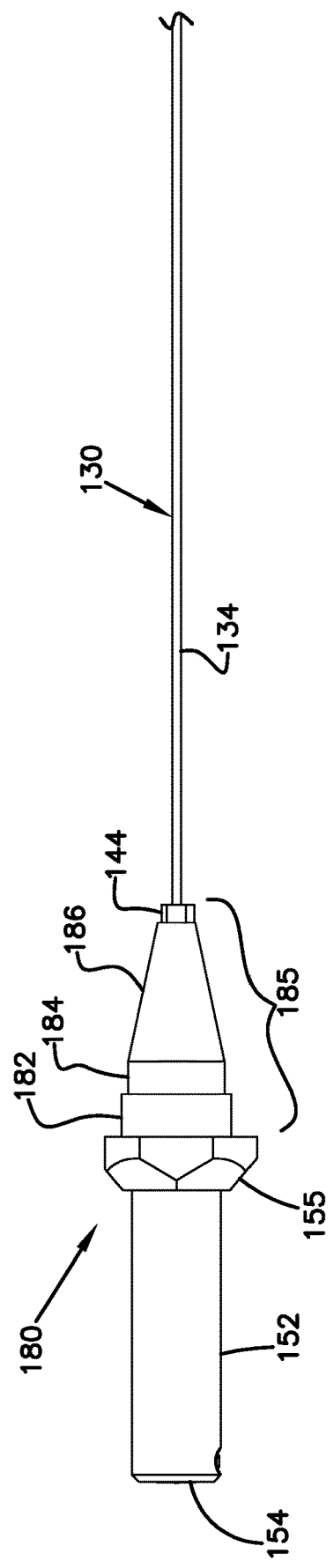
FIG. 9 is a side elevational view of the ferrule assembly of FIG. 8.

A second mold operation 107 positions a hub mold over the partial hub 160 and grip arrangement 140 and injects a molding material into the hub mold. Accordingly, the second mold operation 107 produces a ferrule assembly 180 including a ferrule 160 and hub 185. An example ferrule assembly 180 resulting from the second mold operation 107 is shown in FIGS. 8 and 9. The hub 185 can be over-molded using a hub mold of an injection molding systems. In some example molding systems 200A (FIG. 10A), the hub molds are oriented so that the fibers extend vertically through the molds (see FIGS. 11-13). In other example molding systems 200B (FIG. 10B), the hub molds are oriented so that the fibers extend horizontally through the molds (see FIGS. 14-16).

The second mold operation 107 forms a hub 185 over the partial hub 160 and grip arrangement 140 (FIGS. 8 and 9). In certain implementations, the hub 185 is molded to be integral with the partial hub 160. For example, the second mold operation 107 forms a first hub section 182 adjacent the ferrule skirt 155, a second hub section 184 extend axially outwardly from the first hub section 182, and a third hub section 186 that extend axially outwardly from the second hub section 184 (FIG. 9). The third hub section 186 tapers inwardly towards the optical fiber 130 as the third section 186 extends away from the second hub section 184. In some implementations, the hub 185 fully covers the grip arrangement 140. In other implementations, the hub 185 covers a majority of the grip arrangement 140. For example, in the example shown in FIGS. 8 and 9, one of the grip members 144 is disposed outside of the hub 185 at an axial end of the hub 185 opposite the ferrule 150.

The over-molding process 100 performs any appropriate completion procedures and ends at a stop module 108. In some implementations, the flash 158 may be removed from the ferrule assembly 180 (e.g., by a laser). The over-molded ferrule assembly 180 can be utilized in an optical connector (e.g., an LC-type connector, an SC-type connector, an ST-type connector, an FC-type connector, and LX.5-type connector, etc.). For example, conventional optical connector parts can be assembled around the ferrule assembly 180 as known in the art.

Figure 2:
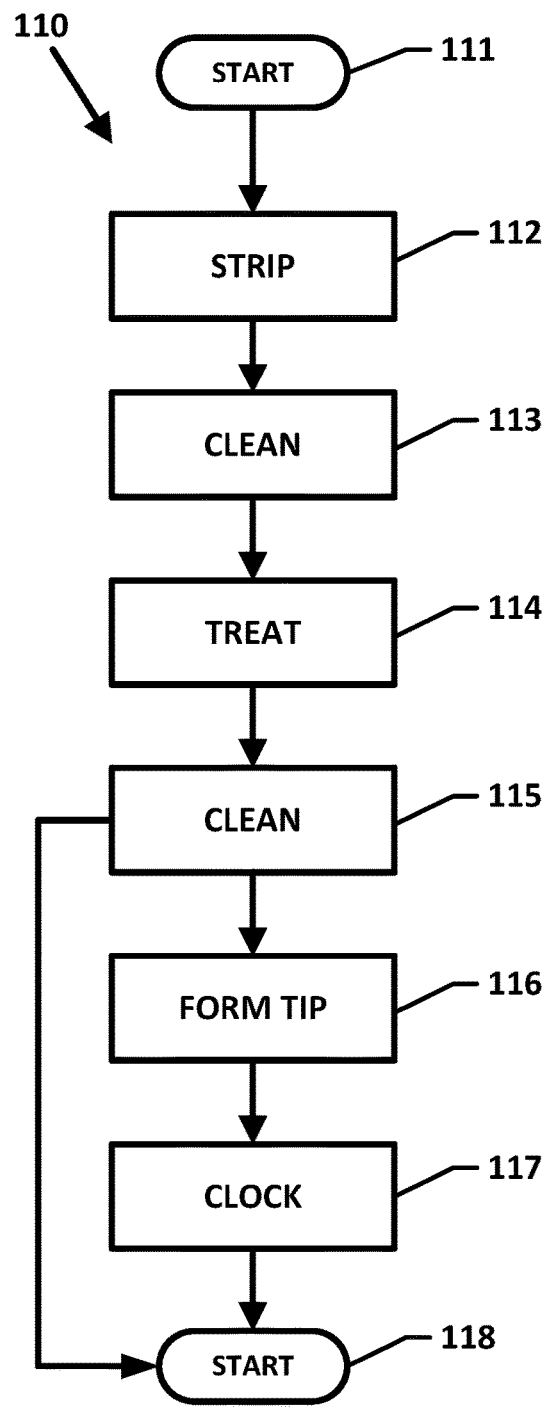
FIG. 2 is a flowchart illustrating an example flow for a fiber preparation process by which the prepare operation of over-molding process can be implemented.

FIG. 2 is a flowchart illustrating an example flow for a fiber preparation process 110 by which the prepare operation 102 of over-molding process 100 can be implemented. The fiber preparation process 110 begins at a start module 111, performs any appropriate initialization procedures, and proceeds to a strip operation 122. In some implementations, the strip operation 122 strips a length of coating 134 from the core and cladding component 132 along a section of optical fiber 130. In certain implementations, the coating 134 is thermo-mechanically stripped from the core and cladding component 132. In other implementations, the coating 134 may be otherwise stripped (e.g., mechanically, chemically, thermally, etc.).

In some implementations, the strip operation 122 removes the coating 134 along a length of no more than 50 mm. In certain implementations, the strip operation 122 removes the coating 134 along a length of no more than 40 mm. In certain implementations, the strip operation 122 removes the coating 134 along a length of no more than 30 mm. In certain implementations, the strip operation 122 removes the coating 134 along a length of no more than 25 mm. In certain implementations, the strip operation 122 removes the coating 134 along a length of no more than 20 mm.

A clean operation 123 removes contaminants (e.g., dust, dirt, debris, oil, etc.) from the stripped optical fiber core and cladding component 132. In some implementations, the clean operation 123 includes placing the stripped section of the fiber 130 in an ultrasonic bath containing a solvent (e.g., acetone). In other implementations, the stripped section may be otherwise cleaned.

A treatment operation 124 applies a protective coating to the cleaned section of the optical fiber core and cladding component 132. In some implementations, the cleaned section of the fiber core and cladding component 132 is immersed in a bath to apply the protective coating. In some implementations, the protective coating inhibits scratching of the fiber core and cladding component 132 and/or core. In certain implementations, the protective coating gives the exterior surface of the fiber core and cladding component 132 hydrophilic properties. In certain implementations, the protective coating includes a Siloxanes solution. In certain implementations, the protective coating is formed from self-assembling monolayers of Siloxanes.

A second clean operation 125 removes excess solution from the fiber core and cladding component 132. In some implementations, the second clean operation 125 includes placing the stripped section of the fiber 130 in an ultrasonic bath containing acetone or another suitable solvent. In other implementations, the stripped section may be otherwise cleaned. In some implementations, the fiber preparation process 110 ends at a stop module 118 when clean. In other implementations, the fiber preparation process 110 may proceed to one or more optional operations to enhance the quality of performance of the optical fiber 130. For example, the form operation 116 may be implemented for Grade A or Grade B optical fibers.

A form operation 116 prepares a terminated end of the treated and cleaned fiber core and cladding component 132. In certain implementations, the terminated end is formed by cutting off an existing axial end of the fiber core and cladding component 132 with a laser to form a clean end. The terminated end is sufficiently smooth that characteristics of the fiber core an cladding component 132 can be measured/analyzed from the terminated end (e.g., via axial illumination). In some implementations, the terminated end of the fiber core and cladding component 132 is formed at least 5 mm and less than 50 mm from a terminated end of the coating 134. In certain implementations, the terminated end of the fiber core and cladding component 132 is formed at least 10 mm and less than 30 mm from a terminated end of the coating 134. In certain implementations, the terminated end of the fiber core and cladding component 132 is formed at least 15 mm and less than 20 mm from a terminated end of the coating 134.

In some implementations, a clock operation 117 determines a desired rotational orientation for the fiber 130. For example, the clock operation 117 can determine whether the fiber core and cladding component 132 is radially offset from a center longitudinal axis of the fiber coating 134. If the core and cladding component 132 is offset, then the clock operation 117 can determine how the fiber core and cladding 130 should be rotationally oriented within the ferrule 150. The orientation indicators produced during the add operation 103 of the over-molding process 100 of FIG. 1 are formed to indicate the desired rotational orientation for the fiber 130.

The fiber preparation 110 performs any appropriate completion procedures and ends at a stop module 118.

Figure 10A:
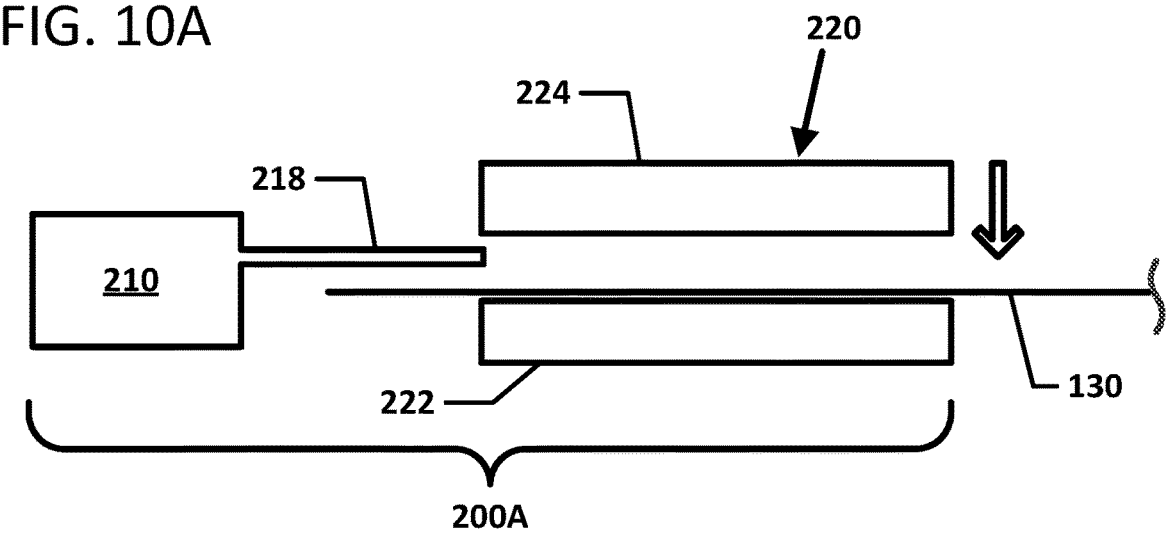
FIG. 10A is a schematic diagram of a material injector interacting with a first type of ferrule mold.
Figure 10B:
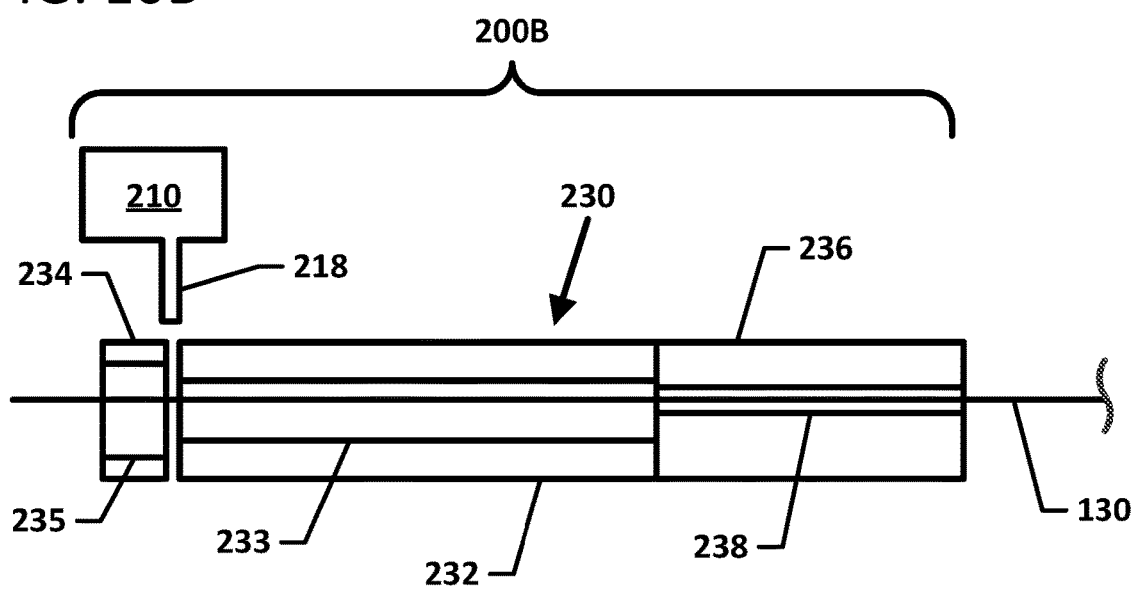
FIG. 10B is a schematic diagram of a material injector interacting with a second type of ferrule mold.

FIGS. 10A and 10B illustrate example injection molding systems 200A, 200B with which one or more ferrule assemblies 180 can be produced. Each of the injection molding systems 200A, 200B includes a material injector 210 and one or more ferrule molds 220, 230, respectively, that are configured to couple to the material injector 210 to receive molding material. Each of the ferrule molds 220, 230 is shaped and sized to form an optical ferrule around an optical fiber 130 received through the ferrule mold 220, 230.

FIG. 10A schematically illustrates a first type of ferrule mold 220 that is configured to enclose a portion of an optical fiber 130. The first type of ferrule mold 220 includes a first (e.g., bottom) mold part 222 and a second (e.g., top) mold part 224 that cooperate to enclose the optical fiber 130. At least one of the mold parts 222, 224 is movable relative to the other to provide access to an interior of the ferrule mold 220 (see FIG. 10A). When opened (i.e., when one or both are moved away from the other), the mold parts 222, 224 separate along a parting line that extends along a longitudinal axis of the ferrule mold 220 (see FIG. 10A). The material injector 210 couples to the ferrule mold 220 at the parting line.

To mold a ferrule assembly 150, an optical fiber 130 is laid along the first mold part 222 so that the fiber 130 extends from opposite axial ends of the first mold part 222 (see FIG. 10A). In some implementations, at least a portion of the prepared section 135 of the optical fiber 130 extends along the first mold part 222. In certain implementations, a majority of the fiber 130 that extends along the first mold part 222 includes the coating 134. The first and second mold parts 222, 224 are moved to a closed position while the material injector 210 has access to the interior of the ferrule mold 220. The fiber exiting the mold cavity (opposite from the ferrule tip) is tensioned. Material is injected into the ferrule mold 220 from the material injector 210. In certain implementations, the material flow is oriented such that fiber movement occurring during the injection process will be biased towards the top of the hub/ferrule assembly, effectively keeping slight movements within the "tuned template" for IEC (International Electrotechnical Commission) Grade B or Grade A requirements. The ferrule mold 220 is opened and removed from the over-molded ferrule assembly 150.

FIG. 10B schematically illustrates a second type of ferrule mold 230 that is configured to enclose a portion of an optical fiber 130. The second type of ferrule mold 230 includes a first (e.g., bottom) mold part 232 and a second (e.g., top) mold part 234 that cooperate to enclose the optical fiber 130. Each part 232, 234 defines a through-passage 233, 235, respectively, that extends longitudinally through the parts 232, 234 to receive the optical fiber 130. At least one of the mold parts 232, 234 is movable relative to the other to provide access to an interior of the ferrule mold 230 (see FIG. 10B). When opened (i.e., when one or both are moved away from the other), the mold parts 232, 234 separate along a parting line that extends transverse to the longitudinal axis of the ferrule mold 230 (see FIG. 10B). The material injector 210 couples to the ferrule mold 230 at the parting line.

In some implementations, the second type of ferrule mold 230 also includes an alignment member 236 that couples to the first mold part 232 at an opposite end from the second mold part 234. The alignment member 236 defines an alignment passage 238 that extends parallel to a central, longitudinal axis of the ferrule mold 230. The alignment passage 238 is radially offset from the central, longitudinal axis of the ferrule mold 230 (see FIG. 10B). Accordingly, the alignment member 236 can be used to maintain the optical fiber 130 at a clocked position (i.e., a position at a desired radial offset) within the ferrule mold 230 during the injection molding process. For example, the alignment member 236 can be used to mechanically bias the fiber 130 towards the top of the hub/ferrule assembly, effectively keeping the fiber 130 at the ferrule tip exit within the "tuned template" for IEC Grade B or Grade A requirements. In some implementations, the alignment member 236 includes a ferrule or ferrule-like part. For example, the alignment member 236 includes a machined ceramic ferrule.

To mold a ferrule assembly 150, an optical fiber 130 is threaded through the through-passage 233 of at least the first mold part 232 so that the fiber 130 extends from opposite axial ends of the first mold part 232 (see FIG. 10A). In some implementations, the fiber 130 also is threaded through the passage 235 of the second mold part 234. In certain implementations, a majority of the fiber 130 that extends along the first mold part 232 includes the coating 134. In certain implementations, the entire length of the fiber 130 that extends along the first mold part 232 includes the coating 134. In certain implementations, part of the length of fiber 130 that extends along the second mold part 232 includes the coating 134. In certain implementations, only the prepared section 135 of the fiber 130 extends along the second mold part 232.

In certain implementations, the fiber 130 also is threaded through the alignment passage 238 defined in the alignment member 236. The alignment member 236 holds the fiber 130 at a desired clocked position (see FIG. 10B). The first and second mold parts 232, 234 are moved to a closed position while the material injector 210 has access to the interior of the ferrule mold 220 at the parting line. Material is injected into the ferrule mold 230 from the material injector 210. The ferrule mold 230 is opened and removed from the over-molded ferrule assembly 150.

FIGS. 11-13 illustrate a first example implementation of a material injector 210 coupled to over-molded ferrule assemblies 180A formed by an implementation of the first type of ferrule mold 220. The material injector 210 includes a main conduit 212; one or more branch conduits 216 coupled to the main conduit 212 to form a continuous passageway therewith; and one or more injector tips 218 that extend from the branch conduits 214. In the example shown, the branch conduits 214 are coupled to the main conduit 212 via a connecting member 214. In some implementations, each branch conduit 216 couples to multiple injector tips 218. In the example shown, each branch conduit 216 couples to two injector tips 218 extending in opposite directions. In other implementations, each branch conduit 216 can couple to a greater or fewer number of injector tips 218 (e.g., one, three, four, six, eight, etc.).

The injector tips 218 have hollow interiors that communicate with the continuous passageway of the material injector 210. In certain implementations, the injector tips 218 taper radially inwardly as the injector tips 218 extend away from the branch conduits 216. The ferrule molds (e.g., ferrule molds 220) are configured to couple to free ends of the injector tips 218 to receive molding material. Each of the ferrule molds 220 is shaped and sized to form an optical ferrule 150 of the ferrule assembly 180A around an optical fiber 130 received through the ferrule mold 220. In some implementations, a separate hub mold can be used to complete the ferrule assembly 180A.

As shown, the over-molded ferrule assemblies 180A have longitudinal axes $L_3$ that extend in-line with the longitudinal axes $L_1$, $L_2$ of the main and branch conduits 212, 216. In the example shown, the injector tips 218 inject material into the ferrule mold 220 in a direction transverse to the longitudinal axis of the ferrule mold 220. In certain implementations, the molding material biases the optical fiber 130 to a radially offset position relative to the longitudinal axis to clock the optical fiber 130 within the over-molded ferrule assembly 180A.

In the example shown, the molding material is injected into the ferrule mold 220 towards the ferrule tip end of the mold 220 so that the flash 158 (i.e., the point of separation between the ferrule 150 and the injector tip 218) is disposed at a location along the circumference of the ferrule body 152. In certain implementations, the flash 158 is located along the parting line of the ferrule mold 220. This flash 158 can be removed from the ferrule body 152 (e.g., using a laser). For example, the ferrule can be processed using a high resolution camera, precision positioning equipment, and laser marking equipment to remove the flash 158.

FIGS. 14-16 illustrates the material injector 210 of FIGS. 11-13 coupled to over-molded ferrule assemblies 180B formed by an implementation of the second type of ferrule mold 230. The ferrule molds (e.g., ferrule molds 230) are configured to couple to free ends of the injector tips 218 to receive molding material. Each of the ferrule molds 230 is shaped and sized to form an optical ferrule 150 of the ferrule assembly 180B around an optical fiber 130 received through the ferrule mold 230. In some implementations, a separate hub mold can be used to complete the ferrule assembly 180B.

As shown, the over-molded ferrule assemblies 180B have longitudinal axes $L_3$ that extend in-line with the longitudinal axes $L_1$, $L_2$ of the main and branch conduits 212, 216. In the example shown, the injector tips 218 inject material into the ferrule mold 220 in a direction transverse to the longitudinal axis of the ferrule mold 220. In the example shown, the molding material is injected into the ferrule mold 230 at a location along the ferrule skirt 155 so that the flash 158 (i.e., the point of separation between the ferrule 150 and the injector tip 218) is not disposed at a location along the circumference of the annular body 152. In certain implementations, the flash 158 is located along the parting line of the ferrule mold 230. This flash 158 can be removed from the ferrule body 152 (e.g., using a laser). Alternatively, this flash 158 can be removed using less precise methods or can be left on the skirt 155.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of manufacturing a fiber optic connector, the method comprising:
    (a) injection molding a grip arrangement around an optical fiber;
    (b) inserting a bare section of the optical fiber into a mold;
    (c) molding a ferrule and a partial hub around the bare section of the optical fiber by injecting molding material into the mold, the partial hub being axially spaced from the grip arrangement;
    (d) molding a ferrule hub over the grip arrangement and the partial hub; and
    (e) assembling a remainder of the fiber optic connector using the ferrule and ferrule hub.

2. The method of claim 1, further comprising forming a fiber tip and positioning the fiber tip relative to the ferrule.

3. The method of claim 2, wherein forming the fiber tip comprises forming a tapered fiber tip prior to inserting the optical fiber into the mold.

4. The method of claim 2, wherein positioning the fiber tip relative to the ferrule comprises:
    scoring part of a coated section of the optical fiber located at an end of the partial hub; and
    pulling the optical fiber until the fiber tip is positioned at a desired location relative to the ferrule.

5. The method of claim 1, further comprising cleaning the bare section of the optical fiber including immersing the bare section in an ultrasonic bath containing a solvent.

6. The method of claim 5, further comprising preparing the optical fiber including treating the bare section of the optical fiber with a hydrophilic polymer coating forming solution after cleaning the bare section of the optical fiber.

7. The method of claim 1, wherein the optical fiber is held at a desired clocked positioned within the mold.

8. The method of claim 1, wherein inserting the bare section into the mold comprises threading the bare section of the optical fiber vertically through the mold.

9. The method of claim 1, wherein inserting the bare section into the mold comprises laying the bare section of the optical fiber horizontally on a bottom portion of the mold and coupling a top portion of the mold to the bottom portion.

10. The method of claim 1, wherein the grip arrangement is configured to indicate a desired clocked position of the optical fiber within the ferrule.

* * * * *